United States Patent [19]

Pelmulder

[11] 4,243,523

[45] Jan. 6, 1981

[54] WATER PURIFICATION PROCESS AND SYSTEM

[75] Inventor: John P. Pelmulder, Saratoga, Calif.

[73] Assignee: Allied Water Corporation, San Francisco, Calif.

[21] Appl. No.: 931,846

[22] Filed: Aug. 7, 1978

Related U.S. Application Data

[63] Continuation-in-part of Ser. No. 842,613, Oct. 17, 1977, abandoned.

[51] Int. Cl.² .................. B01D 13/00; B01D 31/00
[52] U.S. Cl. ................... 210/652; 210/194;
  210/257.2; 210/321.1; 210/416.3; 210/416.1;
  210/433.2
[58] Field of Search ............... 210/22, 23 F, 23 H,
  210/194, 195 R, 197, 257 M, 409, 416 DW, 416
  M, 433 M, 321 R

[56] References Cited

U.S. PATENT DOCUMENTS

| | | | |
|---|---|---|---|
| 3,493,495 | 2/1970 | Mendelson | 210/409 X |
| 3,494,465 | 2/1970 | Nyrop | 210/194 |
| 3,795,609 | 3/1974 | Hill et al. | 210/23 H |
| 4,069,155 | 1/1978 | Tsujimoto et al. | 210/195 R |

*Primary Examiner*—Ferris H. Lander
*Attorney, Agent, or Firm*—Fitch, Even & Tabin

[57] ABSTRACT

Apparatus is described for purifying or desalinating relatively small quantities of water using one or a few membrane units with relatively modest power requirements. The apparatus uses a pump, an eductor or a combination of both in recirculating a portion of the feed water through a reverse osmosis membrane assembly. The method includes recirculating a portion of the feed water through the membrane assembly and discharging a portion of the recirculated feed water from the system.

9 Claims, 8 Drawing Figures

WATER PURIFICATION PROCESS AND SYSTEM

This application is a continuation-in-part of application Ser. No. 842,613, filed Oct. 17, 1977 and now abandoned.

The invention relates to water purification by reverse osmosis and, more particularly, to an improved method and apparatus for desalinating sea water and the like which is particularly suitable for small systems with low power requirements.

In reverse osmosis systems, a feed of an impure solvent such as brackish well water or sea water is conducted to a membrane which is permeable to the water but is far less permeable to the majority of chemicals dissolved in the water (the solutes). The feed water is applied to the membrane at a high pressure, usually considerably in excess of the osmotic pressure of the water, with a result that the water flows through the membrane counter to the normal osmotic flow with the solutes being largely retained at the feed water or concentrate side of the membrane.

As pure water is abstracted from the feed water through the membrane, the concentration of the solutes in the feed water next to the membrane is increased. This increase of concentration can be a serious source of trouble. At worst, it may cause precipitation of one or more solutes and/or caking. At the very least, it results in increased osmotic pressure with a consequent increase in the passage of solute into the product and also a decrease in effective pressure which results in reduced flow of pure water.

In order to prevent these problems associated with increased concentration on the feed water side of the membrane, two things must be accomplished. The first is to replace the bulk of the feed water with fresh feed water as the permeation through the membrane takes place. This is conventionally done by continuously discharging a stream of concentrate from the end of the membrane assembly opposite the feed end. At the same time new feed water is introduced into the feed end of the membrane assembly at a sufficient rate to maintain the high operating pressure against the membrane.

The second requirement is that an adequately high velocity be maintained adjacent to the surface of the membrane. The purpose of the high velocity is to mix the feed solution from the area near the membrane back into the body of the feed solution. This prevents the localized build up of solute concentration near the membrane that is so damaging to the membrane or its performance. In the absence of the mixing effect the abstraction of the pure water from the solution adjacent to the membrane causes a gradient of increasing salinity or concentration towards the membrane. Without the mixing the concentrated dissolved solids can only escape from this layer by diffusing away from the membrane towards the bulk of the feed solution. This phenomenon is also known by the term polarization concentration.

The conventional method of avoiding polarization concentration is to connect the individual membrane elements in combinations such that the flow of concentrate required by chemical process considerations also provides sufficient flow velocity in each individual membrane element. For a low concentration feed water, the chemical process considerations may permit recovery of 90% of the feed water in the form of purified product water as concentrate. For a high concentration feed water the recovering of product water may be limited to 20% of the feed water and 80% would be required to be discharged as concentrate to prevent precipitation of chemicals on the membrane. In a case where each individual membrane element requires a concentrate flow of forty times its product flow it can be seen that 10 elements must be arranged in series to obtain only 20% product recovery (concentrate flow of 4 times the product flow). This is no problem when a large system comprising many elements is being designed. And indeed some membrane elements do not require such great multiples of brine flow as compared to product flow since the flow required depends on such factors as the membrane materials used and the geometry of the membrane element.

When the system being built is small so that a single membrane element or just a few membrane elements are needed, then the requirement for high brine velocity cannot be satisfied by merely selecting the correct arrangement for hooking up the membrane elements. In that case the conventional solution is to increase the brine flow so as to increase the velocity to the minimum permissible value and to increase the feed flow accordingly. However, this increases the amount of feed water that must be raised in pressure from atmospheric pressure to the operating pressure, resulting in increased power requirements.

In reverse osmosis systems utilizing tubular type membrane elements, which typically require a large flow rate to generate a high flow velocity at the membrane surface, the additional flow has sometimes been accomplished by recirculating some or all of the discharged concentrate to the inlet of the system. The added flow through the membrane caused by the recirculation flow increases the velocity adjacent to the membrane surface. Tubular type membranes require a large flow to generate a high velocity at the membrane surface because of the large flow passage cross-sectional area in proportion to the wetted interior surface. Nevertheless, tubular type membrane elements are of advantage when handling fluids which tend to foul the surface of the membrane element. This is because tubular type membranes are more readily cleaned by mechanical means, such as a plug or sponge ball passing through the element.

Although recirculation of the concentration to the inlet side of a reverse osmosis system may be utilized to increase flow velocity, a penalty is incurred. The average concentration of dissolved solids at the surface of the membrane in proportion to the amount of recirculation increases correspondingly. Too high an average concentration can result in a product having unacceptable quality (e.g. excessive salinity).

For a given quality of product (i.e. a maximum acceptable salinity when purifying seawater) and a given average concentration against the membrane, the use of recirculation in a single pass reverse osmosis system requires a reduction in recovery as compared with a system not utilizing recirculation. This is particularly significant when using very low salt passage membranes (in the region of 1 to 1½%) for the production of drinking water from seawater in a single pass, because the feed water pumping power and pump size are proportional to the feed flow rate. Since the feed flow rate, for a given product flow rate, is inversely proportional to the filtrate or product recovery rate, the reduction in recovery required in a system employing recirculation in order to maintain an acceptable level of product salinity necessitates that higher pumping power be utilized. Such increased power requirements are a particular problem in designing seawater desalination systems for small-scale use, such as in households, or on small boats.

Accordingly, it is an object of the present invention to provide an improved reverse osmosis desalination system which has low power or low energy requirements.

It is another object of this invention to provide a means to achieve the required minimum flow velocity in small systems utilizing membrane elements with a large ratio of brine flow to product flow with a minimization of the total power required to operate the system.

Another object of the invention is to provide a minimum water supply for a family where the existing water supply system has failed due to drought or changed local conditions, thus permitting continued use of a home site which would otherwise not be useable.

Other objects will become apparent from the following description, taken in connection with the accompanying drawings wherein:

FIG. 8 is a graph illustrating the relationship between product flow rate and feed flow rate which falls within the scope of the invention.

Figure 1:
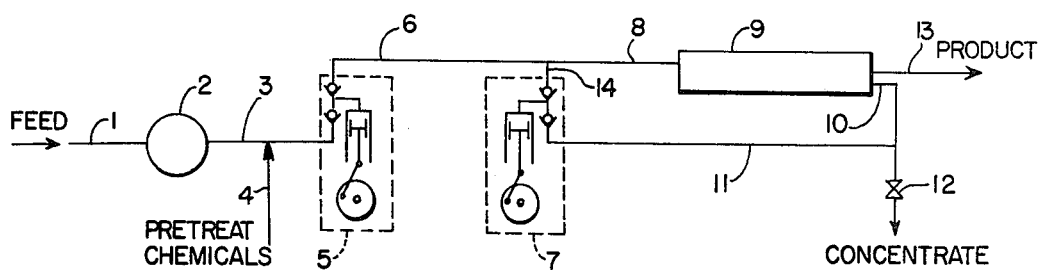
FIG. 1 is a schematic representation of one form of the subject apparatus and method.

In one embodiment of the invention shown in FIG. 1, the added velocity needed in the membrane element is provided by a mechanical circulating pump 7 in conjunction with pipes 11 and 14 appropriately connected. More specifically, the feed water, for example sea water, enters pipe 1 and flows through a cartridge filter 2 for removal of particulate matter. Pre-treatment chemicals, if needed, are injected through pipe 4 into pipe 3 which conducts the feed flow to pump 5. Pump 5 raises the pressure of the feed stream to the desired operating pressure such as 900 psi. From the pump 5, the pressurized feed stream is carried by pipe 6 to the reverse osmosis membrane assembly 9 where the feed flow is separated into the purified product stream and the concentrate stream. The purified product stream exits the membrane assembly through pipe 13 at essentially atmospheric pressure having given up its pressure energy in passing through the membrane. The concentrate stream exits the membrane assembly through pipe 10 at a pressure only slightly reduced from the feed pressure, for example 890 psi. Concentrate or brine leaving the system flows through control valve 12 in order to reduce its pressure to essentially atmospheric pressure prior to discharge. The contribution of this invention is to pull additional concentrate flow from pipe 10, conducting it through pipe 11 to pump 7. In pump 7, the pressure is raised, for example from 890 psi to slightly in excess of 900 psi, causing the recirculated concentrate to flow into pipe 14. From pipe 14 the recirculated flow goes into pipe 6 and then back into and through the membrane assembly 9. As an example, in a system using two PA-300 spiral wound 2"×12" membrane elements in series, the product flow rate is approximately 0.1 gpm. At the recovery of 20% permissible with many feed waters, the feed flow rate would be 0.5 gpm. However, this membrane element requires a brine flow of at least 2 gpm to avoid polarization concentration. Without the use of this invention, the power consumed by the pump 5, assuming 85% overall pump efficiency would be:

$$\frac{2.1 \text{ gpm} \times 900 \text{ psi}}{1714 \text{ constant} \times .85 \text{ efficiency}} = 1.297 \text{ hp.}$$

With the use of this invention, the power input to the two pumps, using the same efficiency assumption for pressurizing would be:

$$\frac{0.5 \text{ gpm} \times 900 \text{ psi}}{1714 \text{ constant} \times .85 \text{ efficiency}} = .309 \text{ hp.}$$

$$\frac{1.6 \text{ gpm} \times 10 \text{ psi}}{1714 \text{ constant} \times .85 \text{ efficiency}} = .011 \text{ hp.}$$

Resulting in a total power consumption of 0.320 hp. This is a saving of 0.977 hp. with this invention. In some instances, the ability to run the machine from a low voltage auxiliary power system or an existing circuit is more important than the cost of the power saved and more than justifies the added complexity of this invention.

As a result of the recirculation of concentrate back to the feed end of the membrane assembly, the concentration of dissolved solids in the feed is increased. This might have been thought to be so detrimental to performance as to make this technique impractical. In fact, if proper parameters are maintained as described below, no undesirable effect on performance occurs in the situation where the recovery of product water is low, such as 20% of the feed flow or lower.

It is significant that the present invention applies to membrane elements having membrane configurations wherein there is a relatively small flow passage cross-sectional area in proportion to the wetted membrane surface. Such membrane elements typically require relatively low flow to generate substantial velocity at the membrane surface, and therefore are susceptible to energy saving with proper design in accordance with the invention. More particularly, the invention applies to so-called spiral type membranes which typically provide a flow passage cross-section of elongated and narrow configuration wherein the ratio of the width to the height at the maximum dimensions of the cross-sectional area is greater than fifty. Beyond this point, namely, wherein the width to height ratio becomes less than fifty, the advantages provided by the invention become marginal.

The feed flow, namely, the flow of material introduced to the system from the source of sea water or the like to be purified, has an operative minimum in accordance with the invention. The feed flow rate must be sufficiently large in comparison to the recirculation rate so as to prevent build-up of concentration on the concentration side of the membrane to such levels that the filtrate or product contains unacceptable levels of salt. In other words, the feed flow must be greater than the minimum level sufficient to maintain the salinity in the filtrate or product at or below the maximum acceptable level. The maximum acceptable level, of course, may vary significantly depending upon local customs and tastes. Typically, however, it will not exceed about 600 ppm solids.

A second constraint on the feed flow rate is that the flow must be less than is sufficient to maintain the minimum velocity at the surface of the membrane. As explained before, the minimum velocity depends upon the type of membrane utilized and typically is given with or may be calculated from parameters provided by membrane manufacturers. Referring to FIG. 8, a plot is shown illustrating feed flow rate F as a function of product flow rate P for a given percent recovery rate R. The relationship between these three parameters is that feed flow is equal to the product flow divided by the recovery flow as a percentage. The percentage recovery is typically preselected in any system design and is dependent on the type of water being purified, the membrane used, the pretreatment of the water prior to entering the reverse osmosis membrane unit, the desired product quality, and the extent of maintenance performed on the unit from time to time. In actual practice, typical recovery rates are in the range of 10% to 20% utilizing the method and apparatus of the invention. The design minimum flow rate (f) for theoretical zero product flow rate is indicated on the abscissa of the graph. The actual feed flow rate should not exceed this minimum figure plus the incremental flow rate resulting from the product, designated on the diagram as f+P. The product flow rate P will be dependent upon the desired water quality, and therefore will be preselected in accordance with the desired water quality and the desired quantity of production. In accordance with the invention, the desired product flow up to the maximum (P max.) is selected in accordance with the desired requirements. This figure or rate is then divided by a percent recovery, as will be set by the type of membrane, feed water quality, and other parameters mentioned above. The resultant quotient will fall somewhere along the solid line. Feed flow rate is then selected to be one or above that solid line but below the rate which would provide a minimum flow velocity at the membrane surface, thus falling within the shaded area on the graph. The lower this feed flow rate is within the shaded area, the less energy typically required to produce the product at the desired product flow rate and consequently the higher the recovery rate and the greater the energy saving.

In accordance with the invention, the concentrate is recirculated from the outlet to the inlet of the filter element at a pressure in excess of the osmotic pressure and at a rate sufficient to cause the flow velocity in the flow cross-section of the membrane to exceed the design minimum flow level. The percentage of the concentrate recirculated will vary in accordance with system requirements, and the remainder is then discharged at atmospheric pressure. If too much concentrate is recirculated, the average concentration will exceed desirable level, resulting in degradation of product quality and possibly even resulting in precipitation of salt within the membrane element. Moreover, the amount recirculated must, of course, be such as to remain within the physical limitations of the membrane element. This operation is continued while maintaining the feed flow rate at a rate which is sufficient to provide salinity in the filtrate below an acceptable level while continuously discharging an amount of the concentrate substantially equal to the difference between the feed flow and the recovery filtrate product flow.

Another way of characterizing the system of the invention as to its size, it may be stated that the invention is applicable for system sizes which are smaller than the point where the feed flow minus the product flow (the concentrate flow) is less than the flow required to maintain a minimum velocity at the membrane surface. Under such circumstances, recirculation in accordance with the invention may be used to advantage. As a practical matter, the invention becomes significant only where the difference between the feed flow and the product flow is much smaller than that required to maintain the minimum velocity at the membrane surface to make it economically worthwhile to install the recirculation pump and piping. To maintain product quality equal to that of a non-recirculating system (in which the feed flow is increased to maintain the flow velocity at the membrane surface higher than the minimum flow velocity) one may determine the equivalent recovery rate in accordance with the formula:

$$R' = \frac{R + P/V}{2 + P/V}$$

where:
R = the recovery rate in a system not employing recirculation
P = the product flow rate, and
V = the minimum flow required in the membrane.
With recirculation, therefore, it may be determined that
F' = (2FV + PF)/F + V F' therefore provides the flow rate required in the system of the invention utilizing recirculation, as opposed to the parameters of an equivalent system not employing recirculation. From this, recirculation flow rate required to increase the total flow rate to the membrane to that sufficient to provide the minimum velocity may be calculated as $$C = \frac{V - B}{1 + F/V}$$

where B and F are the flows that are used without recirculation at the recovery R as if there were no problem with brine velocity. This accounts for providing a maximum feedflow of less than V. The recirculation rate should be larger than zero and less than V. The discharge brine flow rate using recirculation should be less than V and greater than $$P\left(\frac{1}{R} - 1\right).$$

Since the pump 7 operates across a very low pressure differential, it would be preferable to use a rotary pump which has an intrinsic low pumped head. However, such pumps in appropriate sizes with cases and shaft seals for 1000 psi service are relatively rare. For that reason, a piston pump has been indicated schematically although it is recognized that mechanical friction for this type pump will be so large as to materially reduce the pumping efficiency at about 50% when working against a low differential pressure.

Even with recirculation pump 7 only operating at 50% efficiency, the energy required is only:

$$\frac{1.6 \text{ gpm} \times 10 \text{ psi}}{1714 \text{ constant} \times .50 \text{ efficiency}} = .019 \text{ hp}.$$

The total horsepower for the two pumps is 0.328 hp. with a savings of 0.969 hp.

Figure 2:
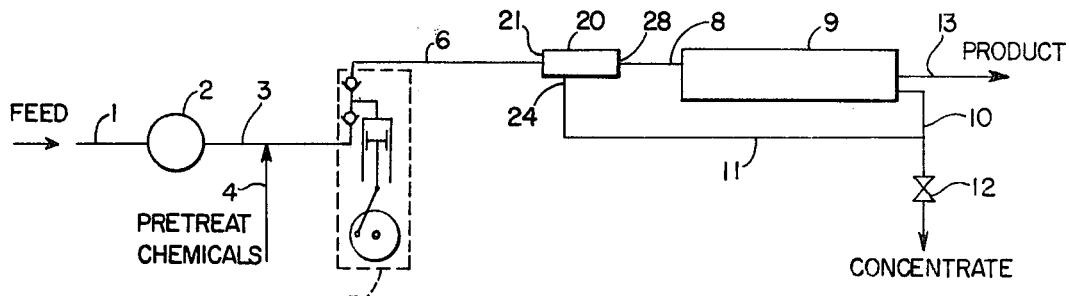
FIG. 2 is a schematic representation of another form of the invention.
Figure 3:
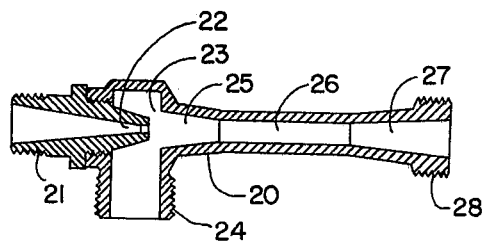
FIG. 3 is an enlarged view of a standard eductor used in the form of the invention illustrated in FIG. 2.

In a second embodiment of the invention, shown in FIG. 2, advantage is taken of the fact that the original feed stream and the recirculated stream can and must be mixed together. In place of the recirculating pump 7 of FIG. 1, an eductor 20 is used as shown in FIG. 2. All other components have the same function and are labelled with the same numbers. An eductor is a commercially available device as detailed in FIG. 3 which admits a high pressure stream of operating fluid through connection 21 and passes the fluid through a nozzle 22. The nozzle 22 has a small area which converts the pressure energy of the operating fluid to velocity energy and reduces the pressure of the operating fluid. The operating fluid then passes into an entrainment area 23. The entrainment area 23 is connected to a suction port 24 which admits the fluid to be pumped. The entrainment area 23 is typically arranged so that the fluid to be pumped annularly surrounds the jet of pumping fluid exiting nozzle 22. This permits entrainment of the fluid to be pumped in the pumping fluid.

The two fluids then enter a converging section 25 and a parallel section 26 which permit complete mixing of the two flows at high velocity. The mixed flow then passes through a diffuser 27 of gradually increasing cross-sectional area in which the velocity energy is converted to pressure energy. The combined flow is then discharged through port 28 at a higher pressure than that existing at the suction port 24. Thus an increased pressure is used to create added flow without the need for additional rotating machinery.

An example of the application of this invention would be a system using two 4" diameter by 40" long PA-300 polyamide spiral would single-stage sea water membrane elements. These are rated for approximately 500 gallons per day product flow each and require a concentrate flow of at least 8 gpm to avoid polarization concentration. With a minimum amount of pretreatment a recovery of 20% can be used so that the feed flow must be 3.5 gpm. With the membrane elements arranged in series the pressure drop from feed to concentrate outlet would be about 20 ft. of water (8.7 psi). Under these conditions a Penberthy ¾" LL Eductor would require an additional 50 psi inlet pressure and would induce a recirculated flow of 5.4 gpm. Thus the total flow into the first membrane element would be 3.5+5.4=8.9 gpm. The product flow removed would be 0.7 gpm leaving a concentrate flow of 8.2 gpm out of the last membrane element.

Comparative power requirements are:

$$\frac{3.5 \text{ gpm} \times 950 \text{ psi}}{1714 \text{ constant} \times .85 \text{ efficiency}} = 2.28 \text{ hp}.$$

for this invention, versus $$\frac{8.7 \text{ gpm} \times 900 \text{ psi}}{1714 \text{ constant} \times .85 \text{ efficiency}} = 5.37 \text{ hp}.$$

for a system pumping 8.7 gpm to the full operating pressure.

It should be noted that the eductor and the recirculation piping are subjected to pressures in the 900-950 psi range and must be of suitable strength and of corrosion resistant material such as bronze or stainless steel. In a further refinement of this invention, shown in FIG. 4, the eductor is installed inside the pressure vessel of the membrane element so as to avoid the foregoing shortcomings. The cylindrical pressure vessel 40 is closed at the ends by end plates 41 retained in place by rings 42 and sealed to the housing by O-rings 43. At the feed end of the housing, pipe 6 from the high pressure pump 5 of FIG. 2 would enter at port 44 in the end plate 41. This is connected by pipe nipple 45 to port 21 of the eductor 20. The suction port of the eductor consists of holes 46 in sleeve 47 which admit the flow to be recirculated into the entrainment area 23. The discharge port 28 of the eductor is fastened into a coupling 48 which forms a diverging passage 49 to further slow the flow out of the eductor and increase its pressure. From there the flow goes into channel 50 of baffle 51. Baffle 51 is sealed to the inside of the pressure vessel cylinder 40 by O-ring 52. One or more ports 53 release the flow into feed area 54 at low velocity. From area 54 the feed flow goes between the layers of the spiral wound membrane element 65 and flows axially to the outer end of the membrane element. Brine seal 55 between the membrane element 65 and the pressure vessel 40 prevents the feed from bypassing the interior of the membrane element and flowing into space 66 which connects with the concentrate discharge area at the other end of the membrane element. Port 56 is provided for connection of pipe 11 of FIG. 2 and recirculation of concentrate. From port 56 the recirculated flow enters area 57 which surrounds holes 46 at the suction of the eductor 20.

Connector sleeve 58 sealed by O-rings 59 is connected to the product tube 60 of the membrane element. Extension tube 61 sealed to baffle 51 with O-ring 62 carries the product flow to port 63 in end plate 41 where it is sealed with O-ring 64. Alternatively, the product flow could be captured at the other end of the permeator with the unused ports at the feed end being plugged or capped.

Figure 4:
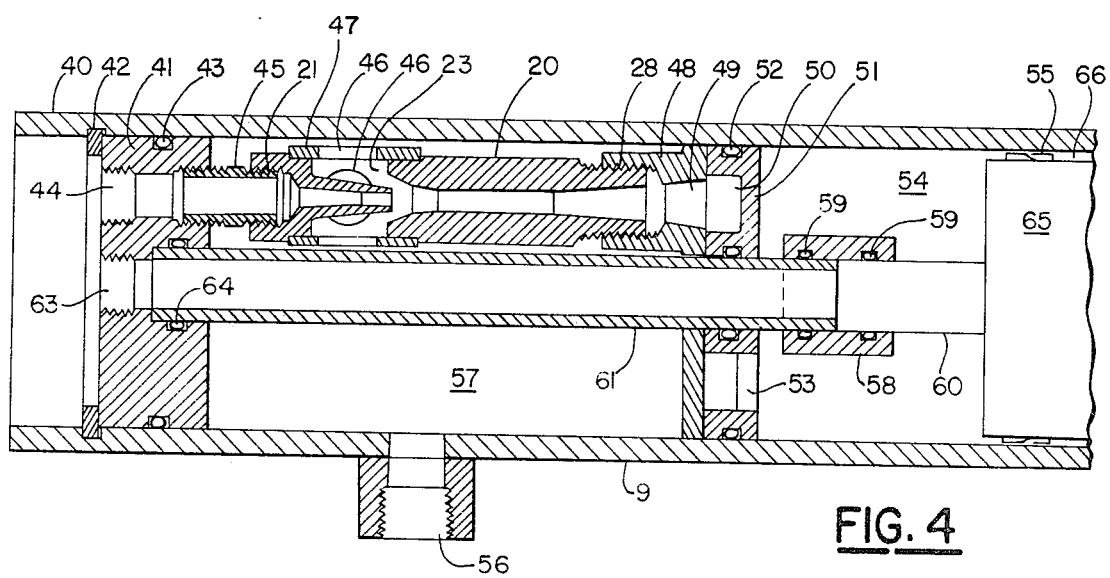
FIG. 4 is a cross-sectional view illustrating a portion of still another form of the invention.
Figure 5:
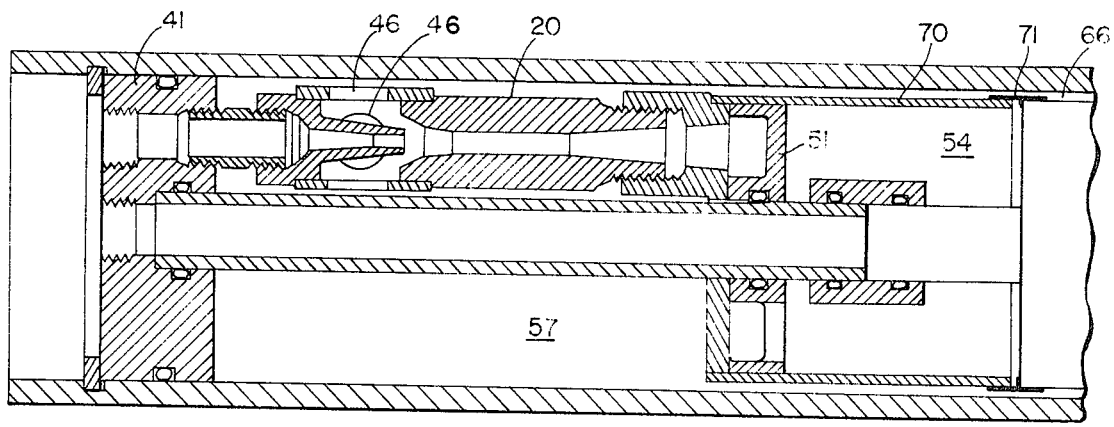
FIG. 5 is a cross-sectional view illustrating a portion of a still further form of the invention.

In a further variation of this invention, shown in FIG. 5, means are provided to include the function of the recirculation pipe 11 within the pressure vessel 40 of the membrane assembly 9. All parts of the end plate 41 and eductor 20 are the same as in FIG. 4 and like parts have been given identical numbers. Sleeve 70 is an extension of baffle 51 which, with seal 71, separates feed area 54 from concentrate area 66. This permits the concentrate being recirculated to flow around sleeve 70 and baffle 51 to reach area 57 and flow into the suction holes 46 of the eductor 20.

In the arrangements shown in both FIGS. 4 and 5, the eductor is only exposed to a pressure differential on the order of 50 psi and can be built of inexpensive, corrosion resistant material such as PVC plastic. This approach also minimizes the number of high pressure pipe fittings needed and the number of locations where serious leaks could occur.

The choice of a system as shown in FIG. 1 versus a system as shown in FIG. 2 will be determined by how well components can be matched to the required flows. The maximum flow which can be pulled through the suction of an eductor is about twice the pumped flow through the nozzle. Therefore, the mechanical pump 7 of FIG. 1 would have to be used anytime that it is desired to exceed that ratio as was the case in the first example given.

Figure 6:
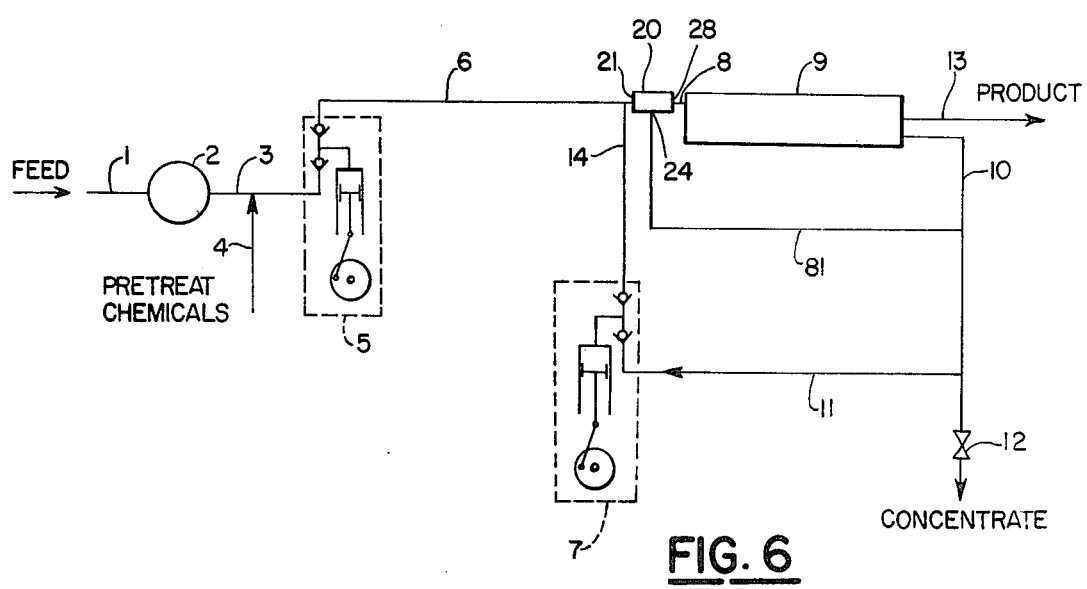
FIG. 6 is a schematic representation of another form of the invention.

As a further development of this approach it is desirable under some circumstances to use both a mechanical pump and an eductor in the same system. As shown in FIG. 6, the discharge of the circulation pump 7 is connected through pipe 14 to the feed pipe 6 which is connected to the nozzle connection 21 of an eductor 20. A parallel recirculation pipe 81 provides flow to the suction port 24 of the eductor. Pipe 8 carries the combined recirculation flow to the membrane assembly 9. It should be understood that the eductor 20 and associated piping can be incorporated in the membrane assembly pressure vessel in accordance with FIGS. 4 and 5 and still comply with the design of FIG. 6. Like parts have been given identical numbers.

The advantage of a system as described in FIG. 6 is that it permits a higher recirculation flow rate than the flow rate of the mechanical pump 7. Also in the case where the pump 7 has the ability to operate at a much higher pressure differential than the pressure drop of the membrane assembly, and as a result the pump's mechanical friction losses are very high, a net power savings can be obtained by using the system of FIG. 6 as compared to the system of FIG. 1 with the pump 7 operating at a lower speed.

Figure 7:
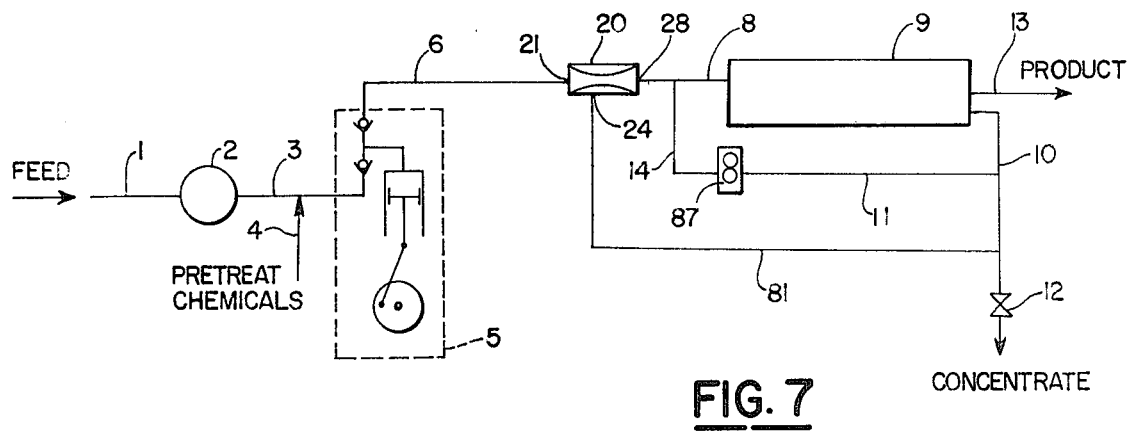
FIG. 7 is a schematic representation of still another form of the invention.

In the case where the circulating pump is a rotary pump capable of generating a limited pressure difference and additional circulation flow is needed, the arrangement of FIG. 7 would be used. In this case the discharge pipe 14 of the rotary circulation pump 87 is connected to pipe 8 at the discharge end 28 of the eductor 20. This results in pump 87 working against the pressure drop of the membrane assembly only and not against the pressure drop of the eductor.

This invention may also be useful for small to medium size reverse osmosis systems where the last one or few membrane elements in series are supplied with inadequate feed flow because of the abstraction of large amounts of product water from the system. In this case, the eductor system of FIGS. 2, 4 or 5 could be used to increase the velocity in the last membrane elements.

What is claimed is:

1. A method for the desalination of sea water and the like to produce potable water, comprising, providing a membrane element with an inlet and an outlet and having a flow cross-section with a width to height ratio of greater than fifty, establishing a feed flow at a pressure in excess of the osmotic pressure to one side of the membrane element, which feed flow is at a rate less than sufficient to maintain the design minimum flow velocity in the flow cross-section of the membrane, recirculating a portion of the concentrate from the outlet to the inlet of the membrane element at a pressure in excess of the osmotic pressure and in excess of the feed flow pressure at a rate sufficient to cause the flow velocity at the surface of the membrane to exceed the design minimum flow velocity, said concentrate being recirculated at a rate which itself is less than the design minimum flow velocity in the flow cross-section of the membrane, recovering permeate product passing through said membrane while maintaining said feed flow at a rate which is sufficient to maintain salinity in said permeate product at or below a maximum acceptable level, and continuously discharging an amount of said concentrate at a rate substantially equal to the difference between the feed flow rate and the recovery permeate product flow rate, said concentrate discharge rate being less than the design minimum flow velocity in the flow cross-section of the membrane and being greater than $$P(\frac{1}{R} - 1)$$

where P is the product flow rate and R is the theoretical recovery rate of product in a system not employing recirculation wherein the theoretical feed flow rate is equivalent to the sum of the actual feed flow rate and the actual recirculation rate.

2. The method of claim 1 wherein the feed flow rate is between 100 gallons per day and 25 gallons per minute, wherein the recirculation rate is between 0.5 gallons per minute and 5 gallons per minute, and wherein the concentrate discharge flow rate is between 90 gallons per day and 22 gallons per minute.

3. The method of claim 1 wherein the recovery flow rate of product with respect to feed flow rate is between about 10% and 20%.

4. Apparatus for desalinating sea water and the like to produce potable water, comprising, a membrane element having an inlet and outlet and having a flow cross-section with a width to height ratio of greater than fifty, means for establishing a feed flow at a pressure in excess of the osmotic pressure to the inlet of the membrane element and at a rate less than sufficient to maintain the design minimum flow velocity at the surface of said membrane element, means for recirculating a portion of the concentrate from said outlet of said membrane element to said inlet of said membrane element at a pressure in excess of the osmotic pressure and in excess of the feed flow pressure and at a rate sufficient to provide a flow velocity at the surface of said membrane which is in excess of the design minimum flow velocity, said concentrate being recirculated at a rate which itself is less than the design minimum flow velocity in the flow cross-section of the membrane, means for recovering said permeate product passing through said membrane, means for maintaining said feed flow at a rate which is sufficient to maintain salinity in said permeate product at or below a maximum acceptable level, and means for continuously discharging an amount of said concentrate at a rate substantially equal to the difference between the feed flow rate and the permeate product flow rate, said concentrate discharge rate being less than the design minimum flow velocity in the flow cross-section of the membrane and being greater than $$P(\frac{1}{R} - 1)$$

where P is the product flow rate and R is the theoretical recovery rate of product in a system not employing recirculation wherein the theoretical feed flow rate is equivalent to the sum of the actual feed flow rate and the actual recirculation rate.

5. The apparatus of claim 4 wherein said feed flow establishing means are a pump, and wherein said means recirculating said concentrate water include a pump.

6. The apparatus of claim 4 wherein said feed flow establishing means are a pump, and wherein said means recirculating said concentrate water include an eductor.

7. The apparatus of claim 6 wherein said eductor is located within said membrane assembly.

8. The apparatus of claim 6 wherein said recirculating means are located within said membrane assembly.

9. The apparatus of claim 4 wherein said membrane assembly contains only a single membrane element.

* * * * *

UNITED STATES PATENT AND TRADEMARK OFFICE
CERTIFICATE OF CORRECTION

PATENT NO. : 4,243,523
DATED : January 6, 1981
INVENTOR(S) : John .P. Pelmulder

It is certified that error appears in the above-identified patent and that said Letters Patent are hereby corrected as shown below:

In the drawings, add FIGURE 8 to the printed patent.

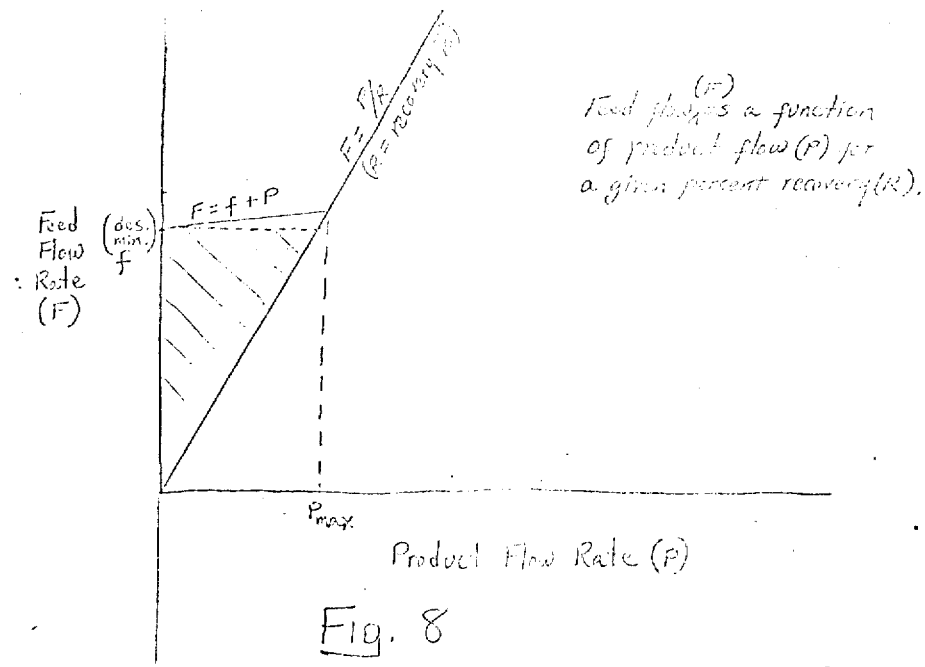

Fig. 8

Signed and Sealed this

Seventeenth Day of November 1981

[SEAL]

Attest:

Attesting Officer

GERALD J. MOSSINGHOFF

Commissioner of Patents and Trademarks